United States Patent
Smith et al.

(10) Patent No.: US 8,560,464 B2
(45) Date of Patent: Oct. 15, 2013

(54) BUSINESS METHOD AND SYSTEM TO PRICE, MANAGE, AND EXECUTE SERVER ACTIONS INITIATED BY ONE OR A PLURALITY OF USERS THROUGH INTERACTION WITH A GRAPHICAL USER INTERFACE LINKED TO A DATA SOURCE OR DATA SUPPLY CHAIN

(75) Inventors: Stanley Smith, Charlotte, NC (US); Joseph Tate, Durham, NC (US); Adam Chasen, Raleigh, NC (US)

(73) Assignee: Stanley Benjamin Smith, Charlotte, NC (US)

( * ) Notice: Subject to any disclaimer, the term of this patent is extended or adjusted under 35 U.S.C. 154(b) by 466 days.

(21) Appl. No.: 12/932,797

(22) Filed: Mar. 7, 2011

(65) Prior Publication Data
US 2012/0173248 A1    Jul. 5, 2012

Related U.S. Application Data

(63) Continuation-in-part of application No. 12/930,280, filed on Jan. 3, 2011, now Pat. No. 8,510,176.

(51) Int. Cl.
G06Q 30/00    (2012.01)

(52) U.S. Cl.
USPC .......................... 705/909; 705/26.1; 705/27.2

(58) Field of Classification Search
USPC ............................................. 705/26, 27, 909
See application file for complete search history.

(56) References Cited

U.S. PATENT DOCUMENTS

| | | | |
|---|---|---|---|
| 5,883,623 A * | 3/1999 | Cseri ............................ | 715/866 |
| 7,272,783 B2 * | 9/2007 | Bauchot et al. ............... | 715/213 |
| 7,574,376 B1 * | 8/2009 | Berman et al. ............. | 705/26.41 |
| 7,676,423 B2 * | 3/2010 | Avery ............................. | 705/37 |
| 7,756,737 B2 * | 7/2010 | Hazzard et al. .............. | 705/7.12 |
| 7,805,356 B2 * | 9/2010 | O'Connor et al. ............ | 705/37 |
| 2004/0260658 A1 * | 12/2004 | Dettinger et al. ............ | 705/400 |
| 2006/0026176 A1 * | 2/2006 | Dettinger et al. ............ | 707/100 |
| 2007/0130132 A1 * | 6/2007 | Wu et al. ........................ | 707/4 |
| 2008/0015962 A1 * | 1/2008 | Smith ............................ | 705/35 |

OTHER PUBLICATIONS

Hyperion: "Hyperion Unveils New Business Intelligence Platform," PR Newswire, Feb. 24, 2004; Dialog file 613 #01117326, 5pgs.*
Brio: "Brio Pushes Information Onto the Desk of Those Who Need It," Computergram International, Nov. 5, 1997; Dialog file 16 #0532473, 2 pgs.*
Business Objects: "Business Objects Delivers Performance Management Applications on Trusted BusinessObjects XI Platform," Business Wire, May 8, 2005; Dialog file 610 #0001279450, 3pgs.*

* cited by examiner

Primary Examiner — Rob Pond

(57) ABSTRACT

A method and system to accept user input into one or a plurality of graphical user interface screens or layouts to generate prices for one or a plurality of actions upon achievement of one or a plurality of trigger values or thresholds within one or a plurality of data sources linked to a data supply chain or a federated data source. The one or plurality of graphical user interfaces enable a user to select link and associate operators with data objects in order to build formulae that include mathematical and logical operations for calculating values to be compared with conditions and thresholds for triggering actions or events by the one or a plurality of servers upon the one or a plurality of data sources and to calculate and store the configuration of the schema for cumulative prices or terms or conditions for implementation of such actions by the one or a plurality of servers.

9 Claims, 7 Drawing Sheets

Figure 1.    Diagram of Event Sequences—Data Tagging

Figure 2. Diagram of Event Sequences –Thresholds and Triggers

Figure 3.

Diagram of Event Sequences—Looping

Figure 4. Diagram of Event Sequences—Acceptance of Pricing

Figure 5.     Diagram of Top Layer Tab Hierarchy

Figure 6. Diagram of Pricing Options

Pricing Options Tabs for Process and Volume [Set By User or Administrator]

Figure 7     Diagram of Sub-Menu Tabs

BUSINESS METHOD AND SYSTEM TO PRICE, MANAGE, AND EXECUTE SERVER ACTIONS INITIATED BY ONE OR A PLURALITY OF USERS THROUGH INTERACTION WITH A GRAPHICAL USER INTERFACE LINKED TO A DATA SOURCE OR DATA SUPPLY CHAIN

This application is a continuation-in-part and claims priority to and benefit of U.S. patent application Ser. No. 12/930,280 filed Jan. 3, 2011, and issued as U.S. Pat. No. 8,510,176 on 13 Aug. 2012 entitled "Method and system using search terms to accumulate, aggregate and price data from a plurality of data originators," by Stanley Benjamin Smith, which is hereby incorporated by reference in its entirety.

BACKGROUND OF THE INVENTION

1. Field of the Invention

If a data economy or free market for data is to be a practical possibility, users of data supply chains or federated data sources using capabilities of the Internet or the emerging capability of distributed computing across multiple devices or the utilization of "cloud" housed computing resources must be able to establish pricing schemata or monetization procedures that go beyond fees for exchange of data alone and fold in pricing for all aspects of the data exchange process.

The concept of pricing for transactions is not a new idea, but it has not been applied systematically to a market for data transfer, utilization, and exchange and particularly to user interactions with graphical user interfaces through which choices and server actions and events that would be involved in such exchanges is part of the pricing formulation. Granularity in pricing and multiple ways for considering or shaping pricing can be implemented through retaining and classifying user interactions with graphical user interface that accesses a data source or a data supply chain. Systems and methods for achieving this have not been fully explicated. It is the purpose of this patent to define a system and method to include aspects of the data exchange process that have not been used to price data exchange and to make such pricing flexible and configurable.

Current methods for calculation of prices focus on either the data source itself or the number of data objects that are drawn down from the data source, or both. While these are an essential component of a pricing schema, there are more systems and methods to configure pricing for a data supply chain or a federated data source.

It has been common practice in data source management to create and store a record of interactions with the data source. These logs of transactions are essential for retaining good histories and insuring versioning integrity of data sources. A few processes, such as Amazon.com will calculate and accumulate counts of interactions with a data source to include into pricing schema. Even more rare is calculation and retention of counts of interactions with graphical user interfaces for the purpose of building pricing schemata. The number of times a data object is accessed in the course of its inclusion within a data supply chain or federated data source, its "popularity" has not yet been included into a pricing schema. Pricing and ranking key words offers an analogous intent for pricing and ranking, but the system and method are entirely different.

A standard calculator is an example of a graphical user interface where the user selects a series of digits and mathematical operators to enter into a calculation. Each one of these interactions can be recorded and counted and used to generate a tally and apply a fee or cost per volume of interactions by a user with the calculator. Expanding from the example of interactions with a calculator to one or a plurality of interactions with a graphical user interfaces yields a good analogy of the mechanisms for the system and method described herein.

Calculators are often divided into declarative or button operated (imperative) types. Electronic spreadsheets are an example of data sources that commonly use declarative calculators because users will sometimes want to use results of calculations to instruct a computer to perform specific user defined actions upon the data source. Declarative calculators allow for more complex sets of instructions to be entered as well as obviate the sequences of the calculations. Button based calculators are also sometimes called "imperative" calculators because they execute actions immediately upon the values being entered into them as an operator is selected. When button based calculators are provided with computer readable code in software applications, they are usually external to a data source and applied to simple mathematical operations where a user enters or copies and pastes a value or a plurality of values into the calculator interface. Hybrid calculators use declarative as well as button driven graphical user interfaces (GUI's). The system and method described herein enables the use of a graphical user interface (GUI) that combines features and capabilities of declarative and imperative calculators.

Macros and other snippets of computer readable code are also commonly included as part of the processing capability within a data source. These macros will often initiate further actions through forward chaining or backward chaining within a data source upon attainment of a trigger value or a threshold derived from computations of formulae as these interact with changes in fields or data objects within a data source. The user will create the macro and will usually run it manually and sometimes run it upon a schedule. Less common, though not unusual, are macros that run automatically upon attainment of a trigger condition or threshold. Microsoft Corporation and other large software companies have developed suites of computer software applications like Microsoft Office that often include an ability to initiate actions and operations internal to the suite of applications. Less common is the ability to initiate actions or operations external to a suite of applications, though these do exist. These are, however, universally tied into a single data source structure and configuration and often require a user to have a license for the data structure or the data source. An additional constraint for these is that they are often integral to the architecture of the application code which facilitates a particular business process that interfaces with a particular data source.

The system and method described herein may be embodied in variants decoupled from a single data source. It also may be decoupled from particular business processes and made available to multiple business processes with no decrease in utility or applicability. In cases where the embodiment is decoupled from a single data source, it can be implemented upon any data source associated with a data supply chain.

Some computer software applications, often in the statistical and mathematical arena, (such as SPSS or SAS) will offer several variants or extensions of computer readable code to enable users to link their own formulae into an application and thus produce values that might trigger further operations. These are often unwieldy and require extensive knowledge of computer coding or knowledge of the specific software application and design. These links to formulae or the values produced by them are often posted as menu choices within sub-menus of these applications. A universal graphical user interface (GUI) for creating and building macros for any variant of an electronic spreadsheet or other data source has not been available. Embodiments of this system and method do not have to be wrapped into the architecture or computer readable code of particular software applications because the system and method is universally applicable to any data source.

Business intelligence software applications such as Business Objects or Cognos separate the calculation process from real time data creation and federation. In effect, they build a calculation layer on top of a data source or a set of data sources. These computer applications do not include pricing schemata because they assume the user of the software applications is also the owner of the data source. There is, however an advantage to linking data accumulated into a data supply chain to the pricing of server actions in real time. The advantage of the capability to price data accumulation together with actions upon the data in real time becomes especially apparent when the data is from disparate sources or owners. A seamless automated process that enables automated payment of fees for access to data or use of data or products or reports derived from data facilitates a market for data exchange. Embodiments of this system and method enable the linking of data accumulation and actions upon accumulated data to generate real time pricing and monetization of transactions involving data exchange.

A GUI that functions with similar ease and flexibility of a social networking site will reduce fragmentation of research, encourage data exchange, and enable measures of the number of times a data field is accessed. Absent an architecture for configuring interaction of a GUI with a data source, the vast variation of forms and formats and operating systems will remain a difficult barrier for the building of data supply chains. Overcoming this barrier will reduce the wasteful need for software engineers and information technology consultants to create one-off applications or integrations.

2. Description of the Related Art

Data sources, such as spreadsheets and databases enable users to build an almost unlimited number of formulae associated with cells or fields within them. There are many variations for creating formulae. The most common is the use of a calculator interface or GUI. However, a formula entered into a cell or a field (also often referred to as a data object) within a data source is isolated from a business process. Merely posting a value into a data object or a field or cell within a spreadsheet does not significantly advance a business process. It is when that value is evaluated for whether it meets a threshold condition or a trigger condition for additional server actions that a business process is enriched. The current art teaches that values that may trigger an event or action can be copied from data fields and posted into computer readable code to initiate actions by the server housing the data source. [Smith (U.S. Pat. No. 7,860,760)]

In the case of this invention; the user constructs the formulae and sets values and counts computed by the formulae or through interaction with the GUI to determine pricing. Each spreadsheet cell or data source field or object can be associated with one or more formulae that are associated with one or more data fields and operands and additional instructions and actions to be used to produce values and counts to use to calculate a fee per data field accessed, to set thresholds for trigger conditions, and to initiate actions by the server. In addition, counts of the number of polls or accesses of a data object within a data supply chain or federated data source can be used as part of the value determination of the data object and the information it references to users of the data supply chain or federated data source. The user may also be provided an option to approve or acknowledge the price for server initiated actions prior to the initiation of those actions by the server.

There is a need for alternative methods to manage costs for reporting that include consideration of server processing time and costs for development of computer readable code while being sure data delivered to a user or to surrogates of the user through server actions is usable and appropriate for their unique knowledge management or business intelligence needs. We have coined the term "data accounting" to help those with fiduciary roles or interests within businesses or organizations to view the management of their data as a resource subject to pricing, to scheduling, to planning, and to quality control. This method will reduce the user's risk of getting the wrong data or unstructured data or insufficient data or too much data or data routed to inappropriate recipients from a data source.

A vendor of server time and computer readable code is similarly assured that they will be compensated for the use of their back-end data sources, including the popularity and implied market value of their data along with their computer readable code. Fees for computer readable code to capture data and report it; the cost of websites and other infrastructure to house data sources and provide users with access to them are in direct proportion to which fields the user or the server draws down or acts upon in a data source or a plurality of data sources. Notification of the user of the cost for the data report or other server event or action prior to generation and dispersion of the report or the initiation of the server event or action also helps the user vet the utility of the information and therefore supports a win-win relationship with the vendor.

Traditional web portals and local area networks do allow users to specify customized reports through configuration profiles. They do not enable a method and system for data accounting to be associated with data fields wherein policies systems and methods for events and actions and reporting upon the achievement of a threshold or trigger value is included in the price for the server event or action or report to be provided on the fly by values assigned to the data object or field. Neither do they fold in notification to the end user of a report or server event or action of actual utilization of all aspects of the data supply chain for the user to consider as part of the justification for the price or value of the transaction.

Systems and methods for combining graphical user interfaces with pricing calculations are in their infancy. O'Connor (U.S. Pat. No. 7,805,356) teaches a system and method using a graphical user interface for posting offer and buy prices from a data source along vectors for a user to determine an offer price. The intent of the method is to enable a user to make decisions about the purchase of financial instruments or stocks, using the graphical interface as a presentation tool to enhance the interpretation of the values in play. This is common to many of the system and method patents for graphical user interfaces, where the purpose and function of the interface is to use a pictorial or graphic construct to enhance user understanding and ability to interpret information. The system and method described herein is focused on the intersection of the image on the screen with the sequencing and ordering of pricing and other decisions in regard to implementation of a data supply chain. The graphics themselves are not included or involved in the patent. The tracking and storing and pricing of user interactions with the graphical user interface is the pivotal new art within this patent application.

Avery (U.S. Pat. No. 7,676,423) teaches a different approach to a system and method by focusing on the use of a graphical interface for making reservations through establishing the sequences and steps undertaken by a user. The methods and system used by Avery (U.S. Pat. No. 7,676,423) differs vastly from the calculation and count focus of the system and method of this patent, but shares a similar focus on sequencing and guiding user behaviors.

Bauchot (U.S. Pat. No. 7,272,783) teaches a method for storing a user options table with a spreadsheet that "comprises a user option index, a name of a corresponding user option associated with the record, and a status value of the corresponding user option associated with the record." At first glance the term "value" for the corresponding user might indicate an association with pricing, but it does not; it simply indicates the retention of the "value" or information on the status of the choice made for actions upon records. While the system and method described herein also stores statuses and choices made by users (as do many programs with computer readable code) we do not do so only within the same spreadsheet we are accessing, but also within a table or data source that is part of a federated data source or a part of the data supply chain.

Cseri (U.S. Pat. No. 5,883,623) teaches a method for linking user interface objects to other objects through user interface objects associated with a single event or a plurality of events and chaining an additional series of events to changes in properties of one or more of the linked events. In effect, Cseri (U.S. Pat. No. 5,883,623) also is building triggers, though these are based on a series of display and other properties and propagated to linked fields on the same server in a similar fashion to synchronization routines. Cseri (U.S. Pat. No. 5,883,623) does not teach cross-server linkages or updates, not does Cseri (U.S. Pat. No. 5,883,623) deal with pricing for events.

Hazzard (U.S. Pat. No. 7,756,737) is one of the few patents teaching pricing calculation in regard to usage levels and user and server events. However, Hazzard (U.S. Pat. No. 7,756, 737) does not address data, but use of enterprise software and support services related to software.

SUMMARY OF THE INVENTION

The present invention is directed to track and count user interactions with one or a plurality of graphical user interfaces housed on a server that interact with data sources to generate a price for interactions with the graphical user interface as these drive server interactions with a data source and to also accumulate counts of accesses of data objects to assess their popularity or market value.

BRIEF DESCRIPTION OF THE DRAWINGS

Other aspects, features, and advantages of the present invention will become more fully apparent from the following detailed description, the appended claims, and the accompanying drawings in which:

DETAILED DESCRIPTION OF THE INVENTION AND PREFERRED EMBODIMENTS THEREOF

The user interacts with one or a plurality of graphical user interface screens or layouts to configure and implement pricing and one or a plurality of actions or events upon achievement of one or a plurality of trigger values or thresholds within one or a plurality data sources; the data sources standing alone or linked to a data supply chain or integrated into a federated data source. The one or plurality of graphical user interfaces enable a user to select link and associate operators with objects in a data source or plurality of data sources in order to build formulae that include mathematical and logical operations for calculating values to be compared with conditions and thresholds for triggering actions or events by the one or a plurality of servers upon the one or a plurality of data sources and to calculate cumulative prices or terms or conditions for implementation of such actions or events by the one or a plurality of servers housing the one or a plurality of data sources.

Computer readable code on the server housing the graphical user interface keeps count of and performs calculations upon the number of data sources selected by the user, the number of data objects accessed, the number or times the data object is accessed by the single user of the data supply chain or federated source and by all the users of the one or a plurality of data sources, the number of operators applied to the data objects included into the data supply chain or the federated data source, the number of server actions or events resulting from triggers or thresholds calculated by computer readable code and applied to data objects in the data supply chain or federated data source through additional forward chaining or backward chaining procedures (forward chaining and backward chaining result from server actions) executed by computer readable code, and the number of other servers or users of servers involved in one way or bilateral or multilateral responses or actions by the first server or a plurality of servers included in the data supply chain. These counts are stored on the server housing the graphical user interface along with pricing schemata built from these choices. Computer readable code implements formulae to calculate prices fees charges or terms to be applied or accepts user input to adjust fees prices charges or terms. Values calculated by the formulae may be used to adjust fees prices charges or terms for access to and inclusion of a data source into a data supply chain or federated data source. Values calculated by the formulae may also be used to generate one or a plurality of adjustments to fees prices charges or terms based on additional criteria such as the popularity counts of the data objects, the timeliness of updated data, a weight for the one or a plurality of contributors or sources of the data (sometimes called a "reputation rating,") and one or a plurality of other factors such as geographic location, language of origin, domain of knowledge, or other criteria as may be set by the user of the server for inclusion into the formula for calculating prices fees or terms.

Additional inputs and values resulting from calculations of the formulae obtained through systems and methods external to this patent may also be folded into the calculations of prices fees charges or terms calculated for the one or a plurality of data objects accessed in the one or a plurality of data sources included in the data supply chain [Smith (U.S. Pat. No. 7,860, 760)] and prices fees charges or terms for access to one or a plurality of data sources by mutual agreement of owners of one or a plurality of included data sources. [Smith (Ser. No. 12/930,280)]

DETAILED DESCRIPTION OF THE DRAWINGS AND HOW THEY EMBODY THE INVENTION

The present invention is a pricing schema that counts, prices, and stores user or server interactions with one or a plurality of graphical user interfaces. Those user or server interactions may be one or a plurality of the following: selection(s) of data objects to be operated upon or calculated within a data supply chain or federated data source; selection(s) of mathematical operators to operate upon one or a plurality of selected data objects; selection(s) of conditions to trigger events or actions to execute if a calculation reaches a threshold or trigger value; selection(s) of types of actions or events that may be triggered by achievement of a threshold value; selection(s) of targets or recipients of the triggered actions or events; selection(s) of the response options and choices of the servers or users who are included in the actions or events; and selection of additional loops of backward chaining and forward chaining actions and events within the data supply chain or federated data source.

Computer readable code presents a series of user selectable regions wherein a user may adjust or accept the price or terms for actions or events triggered through participation in the data supply chain or within a federated data source. The fee for each type of count may be adjusted by a user with rights to do so. The user will build a pricing configuration formula in accordance with the present invention. This formula includes computer readable instructions to specify how data fields within the data supply chain are to be presented through the GUI and how the chain of interactions upon data fields are to be priced through cumulative calculations.

Represented in the Figures is one of many possible embodiments of the invention. The arrangement and ordering of the various components, sequences, actions, and choices may vary considerably for each configuration of the one or a plurality of graphical user interfaces to implement the invention. A designer of the graphical user interfaces to implement this invention can structure computer readable code to retain or constrain counts of user interactions and thus increase or reduce the number of countable user interactions to include in the formulae to use to calculate pricing. Different users with different access or rights or views of the graphical user interfaces may also impact the user interactions that can be counted and inserted into formulae or used for calculations. The designer of the graphical user interface may also fold in other automatic or user selected pricing alternatives or options or choices involved in the data supply chain that do not include counts of interactions with the graphical user interface, but are dependent upon access to one or more of the graphical user interfaces associated with a data supply chain.

Figure 1:
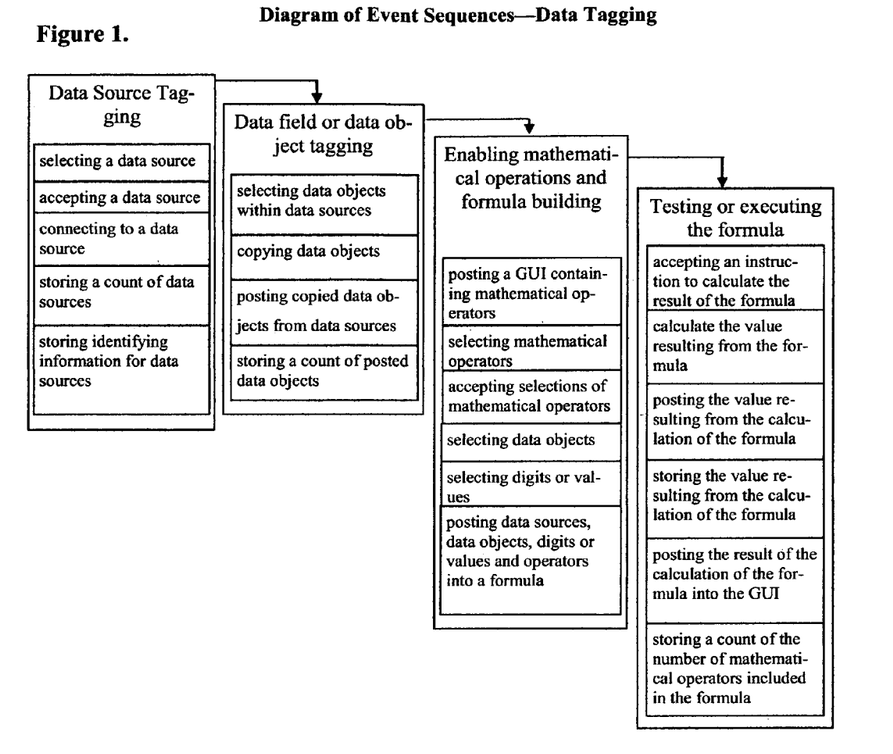
FIG. 1 is a block diagram illustrating various components in accordance with one embodiment of the present invention.
Figure 2:
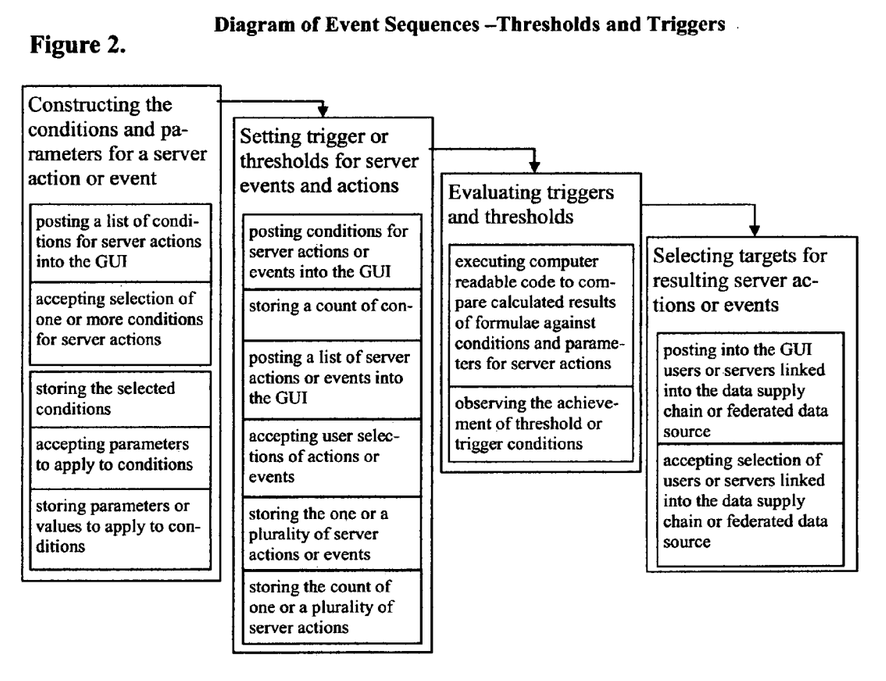
FIG. 2 is a block diagram illustrating various components in accordance with one embodiment of the present invention.
Figure 3:
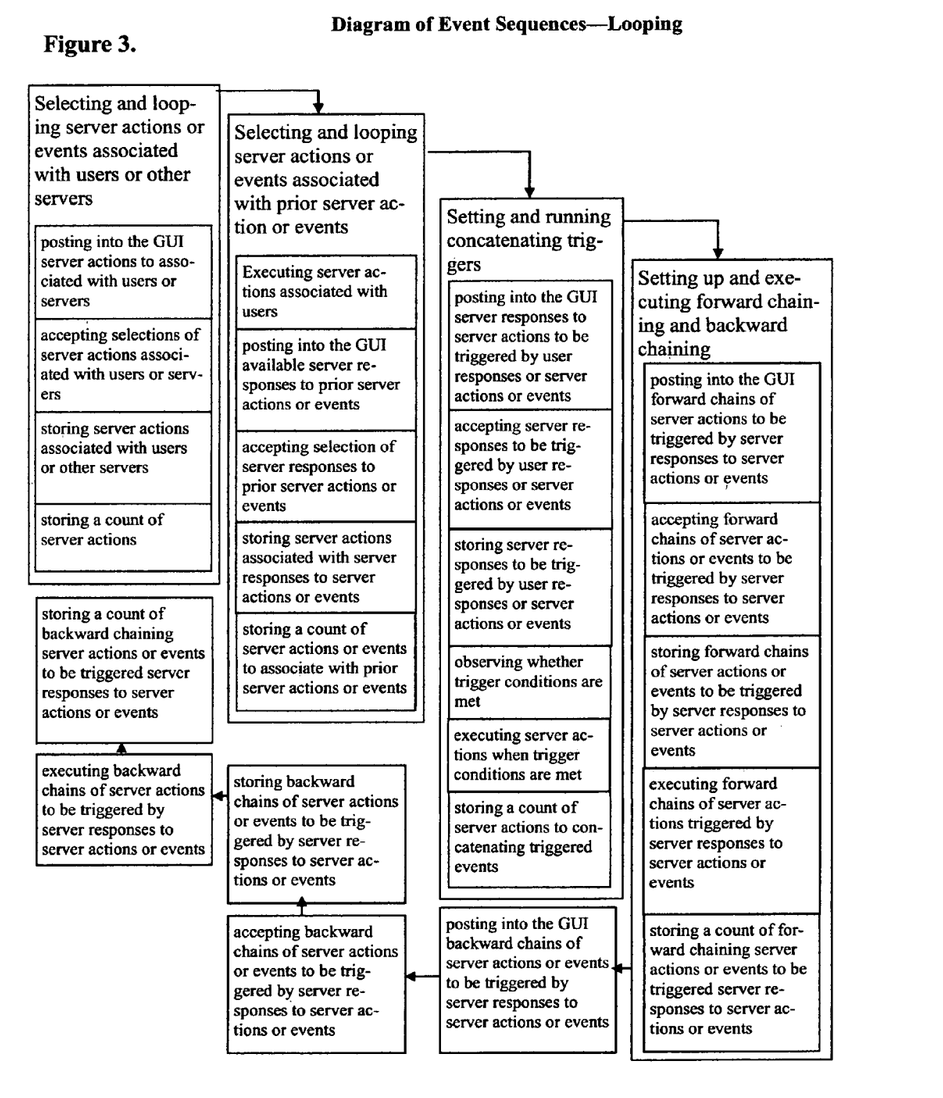
FIG. 3 is a block diagram illustrating various components in accordance with one embodiment of the present invention.
Figure 4:
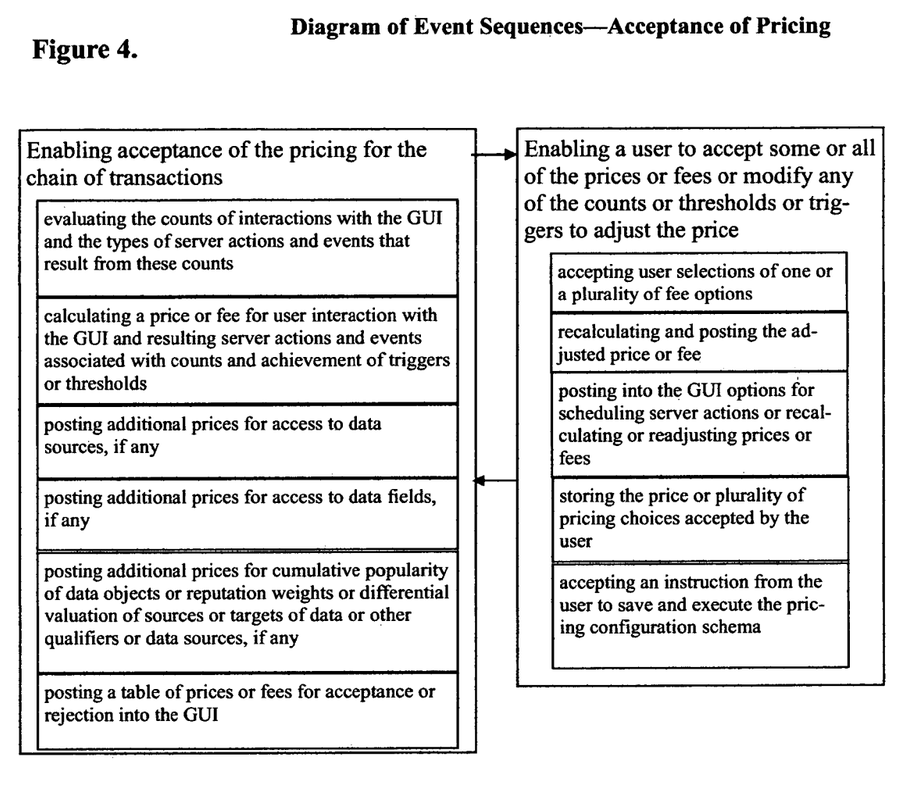
FIG. 4 is a block diagram illustrating various components in accordance with one embodiment of the present invention.

FIG. 1 illustrates the chain of events in the following sequence:
Data Source Tagging
   Selecting viewing and posting a data source
   accepting a data source
   connecting a to a data source
   storing a count of data sources
   storing identifying information for data sources
Data-Field or Data Object Tagging
   selecting data objects within data sources
   copying data objects from data sources
   posting copied data objects from data sources
   storing a count of posted data objects
Enabling Mathematical Operations and Formula Building
   posting a GUI containing mathematical operators
   selecting mathematical operators
   accepting selections of mathematical operators
   selecting data objects
   selecting digits or values
   posting data sources, data objects, digits or values and operators into a formula
Testing or Executing the Formula
   accepting an instruction to calculate the result of the formula
   calculate the value resulting from the formula
   posting the value resulting from the calculation of the formula
   storing the value resulting from the calculation of the formula
   posting the result of the calculation of the formula into the GUI
   storing a count of the number of mathematical operators included in the final formula FIG. 2 illustrates the chain of events in the following sequence:
Constructing the Conditions and Parameters for a Server Action or Event
   posting a list of conditions for server actions into the GUI
   accepting selection of one or more conditions
   storing the selected conditions
   accepting parameters or values to apply to conditions
   storing parameters or values to apply to conditions
Setting Trigger or Thresholds for Server Events and Actions
   posting conditions for server actions or events into the GUI
   storing a count of conditions and parameters for server action or events
   posting a list of server actions or events into the GUI
   accepting selections of actions or events
   storing the one or a plurality of server actions or events
Evaluating Triggers and Thresholds
   executing computer readable code to compare calculated results of formulae against conditions and parameters for server actions
   observing the achievement of threshold or trigger conditions
Selecting Targets for Resulting Server Actions or Events
   posting into the GUI users or servers linked into the data supply chain or federated data source
   accepting selection of users or servers linked into the data supply chain or federated data source FIG. 3 illustrates the chain of events in the following sequence:
Selecting and Looping Server Actions or Events Associated with Users or Other Servers
   posting into the GUI server actions to associated with users or servers
   accepting selections of server actions associated with users or servers
   storing server actions associated with users or other servers
   storing a count server actions associated with users or other servers
Selecting and Looping Server Actions or Events Associated with Prior Server Action or Events
   posting into the GUI available server responses to prior server actions or events
   accepting selection of server responses to prior server actions or events
   storing server actions associated with server responses to server actions or events storing a count server of server actions or events to associate with prior server actions or events Setting Concatenating Triggers
    posting into the GUI server responses to server actions to be triggered by user responses or server actions or events
    accepting server responses to be triggered by user responses or server actions or events
    storing server responses to be triggered by user responses or server actions or events
    storing a count of server responses to be triggered user responses or server actions or events Setting Up Forward Chaining and Backward Chaining
    posting into the GUI forward chains of server actions to be triggered by server responses to server actions or events
    accepting forward chains of server actions or events to be triggered by server responses to server actions or events
    storing forward chains of server actions or events to be triggered by server responses to server actions or events
    storing a count of forward chaining server actions or events to be triggered by server responses to server actions or events
    posting into the GUI forward chains of server actions to be triggered by server responses to server actions or events
    accepting backward chains of server actions or events to be triggered by server responses to server actions or events
    storing backward chains of server actions or events to be triggered by server responses to server actions or events
    storing a count of backward chaining server actions or events to be triggered server responses to server actions or events FIG. 4 illustrates the chain of events in the following sequence:

Enabling Acceptance of the Pricing for the Chain of Transactions
    Evaluating the counts of interactions with the GUI and the types of server actions and events that result from these counts
    Calculating a price or fee for user interaction with the GUI and resulting server actions and events associated with counts and achievement of triggers or thresholds
    Posting additional prices for access to data sources, if any
    Posting additional prices for access to data fields, if any
    Posting additional prices for reputation weights or cumulative popularity ratings, or differential valuation of sources or targets of data or other qualifiers or data sources, if any
    Posting a table of prices or fees for acceptance or rejection into the GUI
    Enabling a user to accept some or all of the prices or fees or modify any of the counts or thresholds or triggers to adjust the price
    Recalculating and posting the adjusted price or fee
    Posting into the GUI options for scheduling server actions or recalculating or readjusting prices or fees
    Upon acceptance of the price, observing whether trigger or threshold conditions for server actions or events have been achieved and executing computer readable code upon all servers or computing devices associated with the data supply chain or federated data source and continuing until all trigger and threshold conditions have been met.

Figure 5:
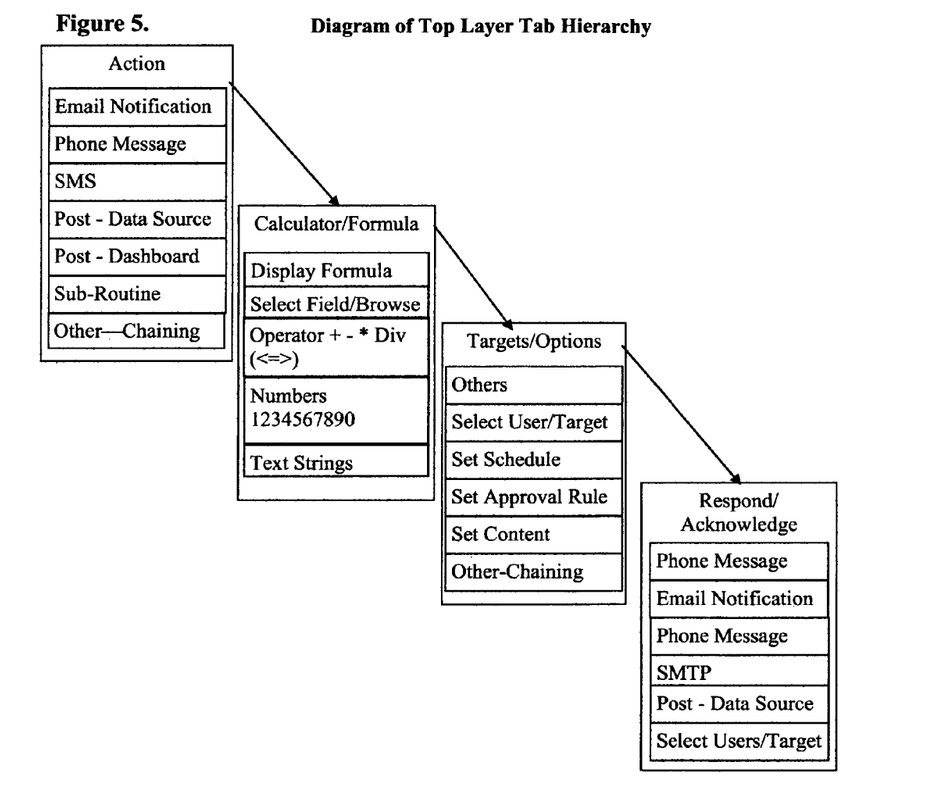
FIG. 5 illustrates the first layer of menu choices in a typical embodiment that might be presented to a user of a GUI.

FIG. 5 illustrates the first layer of menu choices in a typical embodiment that might be presented to a user of a GUI.

Figure 6:
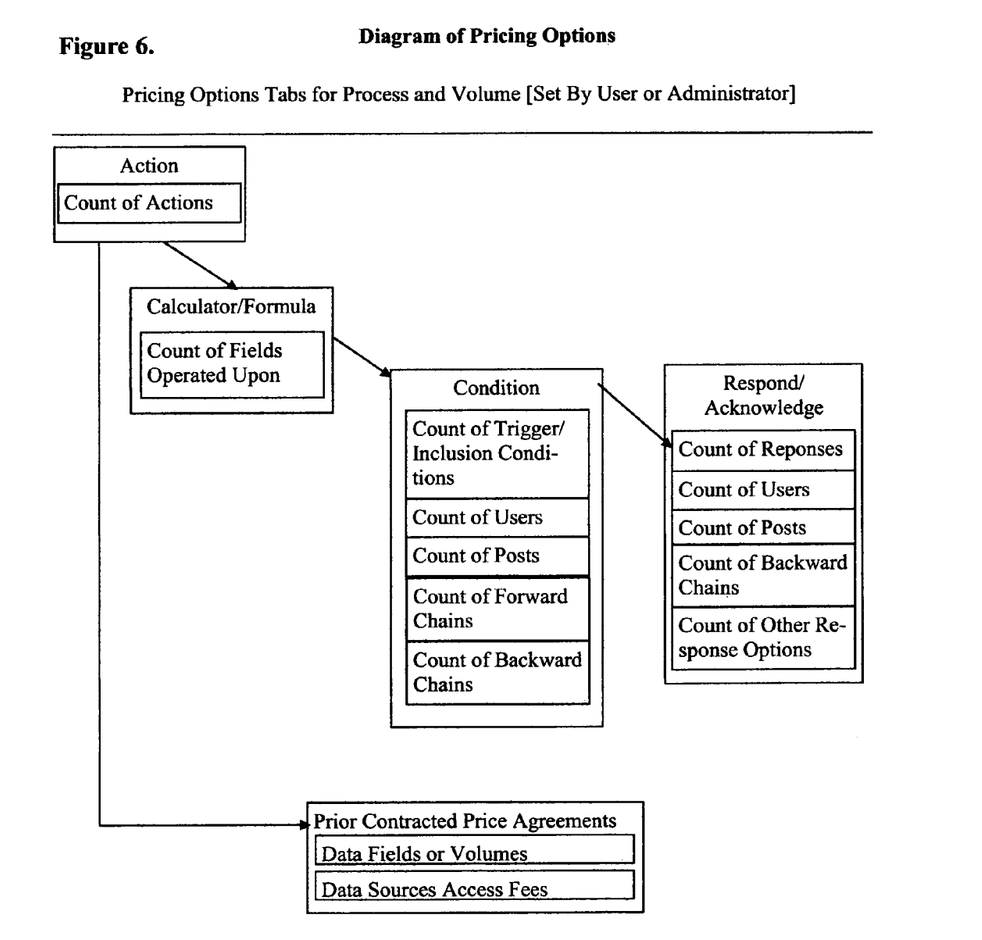
FIG. 6 illustrates the second layer of menu choices in a typical embodiment that might be presented to a user of a GUI.

FIG. 6 illustrates the second layer of menu choices in a typical embodiment that might be presented to a user of a GUI.

Figure 7:
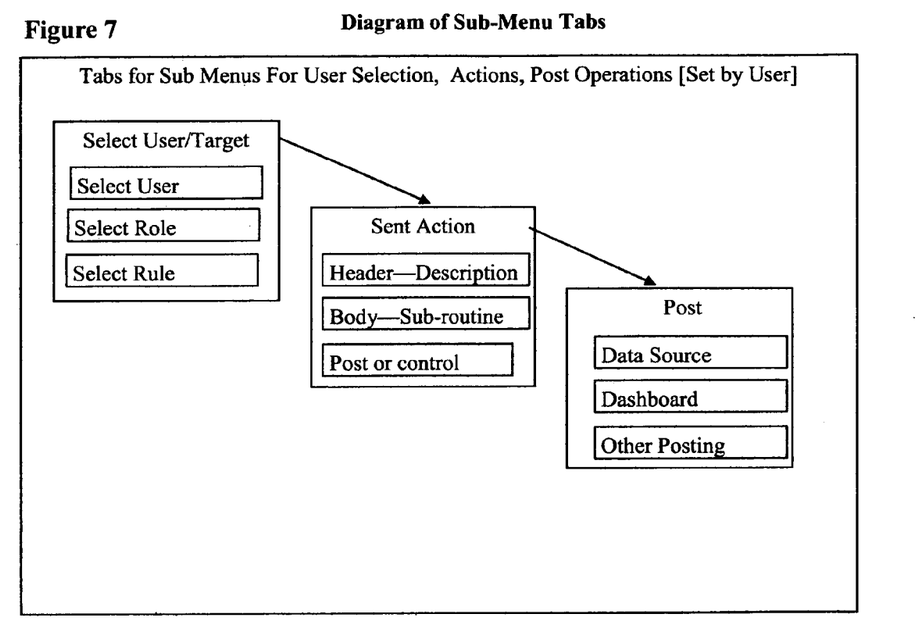
FIG. 7 illustrates a third layer or set of sub menu choices in a typical embodiment that might be presented to a user of a GUI.

FIG. 7 illustrates a third layer or set of sub menu choices in a typical embodiment that might be presented to a user of a GUI.

The invention claimed is:

1. A method of displaying on a screen of a computing device or server a series of dynamic graphical user interfaces or a plurality of regions containing a plurality of dynamic graphical user interfaces comprising:
    selecting for viewing by a user of a first server one or a plurality of data sources housed on one or a plurality of servers;
    accepting by the first server the user's selections of a data source or a plurality of data sources;
    connecting the first server upon instruction from the user to the data source or the plurality of data sources on a second server or a plurality of servers;
    storing a count of the data sources accessed by the first server;
    storing identifying information for the data sources accessed by the first server;
    selecting by the user of the first server one or a plurality of data objects within the one or the plurality of data sources;
    copying by the user of the first server the one or the plurality of data objects from the one or the plurality of data sources housed on the one or the plurality of servers;
    posting onto the first server the one or the plurality of data objects from the one or the plurality of data sources copied from the one or the plurality of servers;
    storing a count of the data objects posted onto the first server;
    posting onto the screen of the first server the dynamic graphical user interface containing symbols of mathematical operators;
    selecting by the user of the first server one or a plurality of symbols of the mathematical operators from the graphical user interface on the first server;
    accepting by the first server the user's selections of the mathematical operators;
    selecting by the user of the first server the one or the plurality of data objects posted from the one or the plurality of data sources;
    selecting by the user of the first server one or a plurality of digits or values from the graphical user interface;
    posting the one or the plurality of data sources, the one or the plurality of data objects, the one or the plurality of digits and operators selected by the user of the first server into a statement of accumulated conditions or relationships for display within the graphical user interface of the first server for use in calculations on the first server;
    accepting from the user of the first server an instruction to calculate the result of the formula constructed by the user of the first server;
    executing computer readable code to calculate the value resulting from the formula constructed by the user of the first server;
    posting the value resulting from the calculation of the formula by the first server into the graphical user interface on the first server;
    storing on the first server the value resulting from the calculation of the formula built though user selection from the graphical user interface;
    posting the result of the calculation of the formula into the dynamic graphical user interface on the screen of the first server;

storing on the first server a count of the number of mathematical operators included in the formula;

posting a list of the conditions for server actions into the dynamic graphical user interface for selection by the user of the first server;

accepting by the server or the user of the server from the first user a selection of the one or the plurality of conditions for server actions;

storing the conditions for server actions to be implemented upon attainment of the value or a plurality of values resulting from the calculation of the formula stored on the first server;

accepting from the first user one or a plurality of parameters or one or a plurality of values to apply to the conditions for server actions selected by the user of the first server;

storing the one or the plurality of parameters or the value or the plurality of values to apply to the conditions for server actions selected by the user of the first server;

posting the result of the conditions for actions of the first server into the dynamic graphical user interface on the screen of the first server;

storing a count of the one or the plurality of conditions and the one or the plurality of parameters on the first server;

posting a list of server actions for selection by the user of the first server into the dynamic graphical user interface on the screen of the first server;

accepting input into the graphical user interface of the one or the plurality of server actions selected by the user of the first server;

storing the one or the plurality of server actions selected by the user of the first server;

storing a count of the one or a plurality of selected server actions on the first server;

executing computer readable code continuously or at intervals to calculate the value or the plurality of values from formulae to compare against conditions and parameters for achievement of one or a plurality of thresholds or trigger conditions for a server action or a plurality of server actions;

observing the achievement of the threshold or the trigger conditions for the one or a plurality of server actions by the one or a plurality of servers;

accepting from the first user a selection of one or plurality of users or servers linked into the data supply chain or the federated data source;

posting into the graphical user interface the one or the plurality of server actions to associate with the one or the plurality of users and servers linked into the data supply chain or federated data source;

accepting from the first user the selection of the one or the plurality of server actions associated with one or the plurality of users linked into the data supply chain or federated data source;

storing the one or the plurality of server actions associated with users of the data supply chain or a federated data source;

storing a count of the one or the plurality of server actions associated with users of the data supply chain or a federated data source;

executing computer readable code to implement the one or a plurality of server actions associated with the one or the plurality of users linked into the data supply chain or the federated data source;

posting into the graphical user interface the one or the plurality of user or server responses to server actions by the first server to associate with the one or the plurality of users or servers linked to the data supply chain or federated data source;

accepting from the first user selection of the one or the plurality of server responses to server actions by the first server to associate with the one or the plurality of users linked to the data supply chain or the federated data source;

storing the one or the plurality of server actions associated with the user or the server responses to server actions by the first server;

storing a count of the one or a plurality of server actions associated with the user or the server responses to server actions by the first server;

posting into the graphical user interface one or the plurality of user or the server responses to server actions by the first server to trigger one or a plurality of user responses or server actions linked to the data supply chain or the federated data source;

accepting from the first user selection of one or a plurality of server responses to trigger the one or the plurality of user responses or server actions linked to the data supply chain or federated data source;

storing the one or the plurality of server responses to trigger one or a plurality of user responses or server actions linked to the data supply chain or federated data source;

observing whether the trigger or threshold conditions are achieved by one or the plurality of user responses or the server actions linked to the data supply chain or federated data source;

executing computer readable code triggered by one or a plurality of user responses or server actions linked to the data supply chain or the federated data source;

storing a count of the one or a plurality of server responses triggered by the one or the plurality of user responses or server actions linked to the data supply chain or the federated data source;

posting into the graphical user interface forward chains of server actions triggered by server responses to server actions or events;

accepting from the first user selection of one or a plurality of forward chains of server actions to trigger one or a plurality of server responses linked to the data supply chain or the federated data source;

storing the one or the plurality of forward chains of server actions to trigger one or a plurality of server responses linked to the data supply chain or the federated data source;

executing computer readable code triggered by the one or the plurality of forward chains of server actions linked to the data supply chain or the federated data source;

storing a count of the one or the plurality of forward chains of server actions triggered by the one or the plurality of server responses linked to the data supply chain or the federated data source;

posting into the graphical user interface backward chains of server actions or events triggered by server responses to server actions or events;

accepting from the first user selection of the one or the plurality of backward chains triggered by the one or the plurality of server responses linked to the data supply chain or the federated data source;

storing the one or the plurality of backward chains of server actions triggered by the one or the plurality of server responses linked to the data supply chain or the federated data source;

executing computer readable code triggered by the one or the plurality of backward chains of server actions linked to the data supply chain or the federated data source;

storing a count of the one or the plurality of backward chains of server actions triggered by the one or the plurality of server responses linked to the data supply chain or the federated data source;

evaluating counts of interactions with the graphical user interface and the types of server actions and events that result from these counts in real time into the graphical user interface;

calculating a price for user interactions with the graphical user interface and the resulting events or actions by the first server or the plurality of servers;

posting additional prices for access to the one or the plurality of data sources if they are to be included;

posting additional prices for access to one or a plurality of data fields if they are to be included;

posting additional prices for cumulative popularity rating or reputation ratings or weights or differential valuation of sources of targets if they are to be included;

posting a summative table of fees for acceptance or rejection into the graphical user interface;

accepting the user's selections of the one or a plurality of fee options or choices;

recalculating and posting the adjusted price for one or a plurality of fees into the graphical user interface;

posting into the graphical user interface choices regarding implementation of server actions;

storing the price or plurality of pricing choices made by the user and accepting an instruction from the user to save and execute the pricing configuration schema.

2. The method of claim 1 further comprising displaying on a screen of a computing device, a region containing a graphical user interface accepting one or a plurality of automated or user selected or formulae calculated values or prices or terms or weights as the number of data sources, fields from data sources, mathematical operations, conditions or parameters included in one or a plurality of the trigger conditions, number of server actions by the first server, number of users or servers included in the server actions, number of responses by servers or users to server actions, and number of server actions triggered and executed by responses to server actions accumulate.

3. The method of claim 1 wherein the formulae that generate the values used to evaluate the achievement of the trigger or threshold condition established by said each user may be automated and propagated to other users.

4. The method of claim 1 wherein the pricing or calculation procedure built by said each user may be automated and propagated to other users.

5. The method of claim 1 wherein values calculated by a formula may trigger assignment of rights to other users as one or a plurality of the forward chaining server actions or as one or a plurality of backward chaining server actions.

6. The method of claim 1 wherein a procedure may specify one or a plurality of values to be shared or posted into one or a plurality of fields within one or a plurality of data sources on one or a plurality of servers.

7. The method of claim 6 wherein the procedure specifies whether actions of the server are reciprocal or one-way.

8. The method of claim 1 wherein the configurations may be static or dynamic.

9. The method of claim 1 wherein the user of the one or a plurality of servers may approve or acknowledge the price calculated for server initiated actions prior to the initiation of those actions by the server.

* * * * *